C. C. EARLYWINE.
NUT LOCK.
APPLICATION FILED FEB. 17, 1908.
920,551.
Patented May 4, 1909.
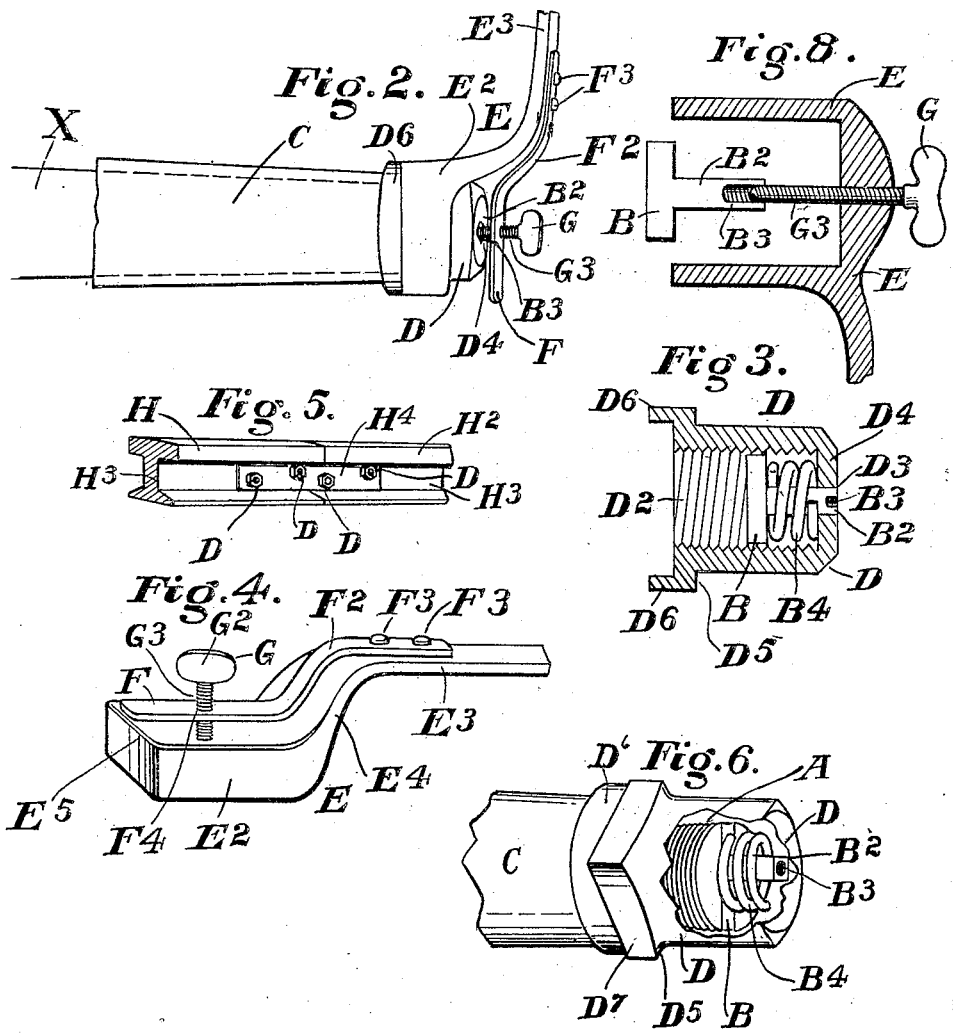

UNITED STATES PATENT OFFICE.

CLIFFORD C. EARLYWINE, OF CINCINNATI, OHIO, ASSIGNOR OF ONE-HALF TO HENRY J. HEILKER, OF CINCINNATI, OHIO.

NUT-LOCK.

No. 920,551.          Specification of Letters Patent.          Patented May 4, 1909.

Application filed February 17, 1908. Serial No. 416,342.

*To all whom it may concern:*

Be it known that I, CLIFFORD C. EARLY-WINE, a citizen of the United States, and a resident of the city of Cincinnati, in the county of Hamilton and State of Ohio, have invented certain new and useful Improvements in Nut-Locks, of which the following is a specification.

The several features of my invention and the various advantages resulting from their use conjointly or otherwise will be apparent from the following description and claims.

In the accompanying drawings making part of this specification, and in which similar characters of reference indicate corresponding parts,—Figure 1 is a view in perspective of the end of an axle or bolt, and of the locking-key with spring, formed and constructed according to my invention. Fig. 2 is a view of the end portion of an axle, hub-sleeve, securing nut in position, and of a wrench with attachments showing my invention respectively applied to the nut and to the locking-key, for enabling the nut, thereby unlocked, to be screwed from off the axle end. This wrench embodies one feature of my invention. Fig. 3 represents a vertical central section of the nut from front to rear of the nut, and an elevation of the locking-key and its shank, and the female screw of this shank. Fig. 4 is a perspective view of the wrench and of the screw rod. Fig. 5 is a view in perspective of my nut lock applied to the bolts which secure the fish plates employed to connect the adjacent ends of two railroad rails, and thereby form a secure joint. Fig. 6 is a view in perspective, the parts broken away, to illustrate the combination of all the parts in position. Fig. 7 represents a modification of the means for withdrawing the key, showing the device for such purpose. Fig. 8 illustrates a modification, partly in section and partly in elevation, of the means for withdrawing the key.

I will now proceed to describe my invention in detail. The member on which the nut is to be screwed may be any article or thing which requires a nut. In the drawing, I have illustrated this member as present in two different uses. In Fig. 1, only that part A of the member which carries the screw thread is shown. In Fig. 2, that part A of Fig. 1, is there conditioned to be the outer or free end of the axle X. A portion only of the latter is shown. The sleeve C on which the hub of the wheel is located, is located as is usual, in such vehicle gear around the axle X.

That end portion of the bolt or axle which carries the screw thread A has in its end a transverse groove $A^2$. I provide a key B, which is adapted to enter this groove $A^2$ and to fit in the latter closely, but not so tightly as to be incapable of being readily withdrawn by human agency. This key has a shank $B^2$, extending centrally from that face of the key which is opposite to the face next to the screw-end A. In the free end of this shank is a hole $B^3$ and this hole is screw-threaded.

D indicates a nut provided interiorly with a screw thread $D^2$. The nut D has a passage way $D^3$ through its rear end. The key B is located within said nut and the free end portion of this key is in this passageway. A spring is present interposed between the key B and the rear inner wall $D^4$ of the chamber of the nut D. The preferred form of this spring $B^4$ is illustrated in Figs. 1 and 3, and is a spiral spring, whose coil surrounds the shank $B^2$ of the key.

Where the nut is to be used with a sleeve and axle as shown in Fig. 2, it is preferably provided with an annular shoulder $D^5$ and an annular flange $D^6$. When the nut is screwed upon the axle, this annular flange $D^6$ embraces the sleeve C, but not so tightly as to be a source of friction. The hub sleeve C turns freely and independently of the nut. The latter must remain stationary on the axle until removed by human agency. The preferred means for enabling the nut to be rotated by means of a wrench are shown and consist of the faces $D^7$, indicated in Fig. 6.

In practice, the nut D is screwed forward onto the part A of the axle. While so securing the nut, the key is or must be held retracted. As the nut advances, the key B is allowed to move toward the end of member A and at last enters the groove $A^2$ of this end of member A. The nut is screwed to place, and in this operation the spring $B^4$ is compressed.

Insomuch as the shank $B^2$ is angulated and the passage $D^3$ is likewise angulated, the nut is held stationary and cannot turn on the axle, because the key B cannot turn on the shank $B^2$. Therefore the nut cannot rotate on the axle. The nut is thus locked in connection with the axle.

When it is desired to unlock the nut from its first connection with the axle, a suitable rod having a screw threaded end is screwed into the screw threaded recess $B^3$. By means of this rod, sufficient force being exerted, the shank $B^2$ and key B are drawn away from the axle, and the key is withdrawn from the groove $A^2$ and the nut is thus unlocked. The nut can be now rotated, and it is rotated and screwed from off the axle end.

In Figs. 2 and 4, I have shown a handy and important device for enabling the operator to hold back the screw threaded rod which is made to engage the shank $B^2$ of the key B, so that the key shall be out of engagement with the end A of the bolt, and at the same time to rotate the nut. This device consists of a wrench E having the part $E^2$ which engages the nut, and the handle $E^3$ of suitable length. In the drawings that part of the handle farthest from the locking part $E^2$ is omitted to economize space for the other figures. The handle $E^3$ is preferably bent out from the locking part $E^2$, as shown at $E^4$, thus following one of the usual forms, for enabling the hand of the operator to remain out of contact with the wall or plate or other surface parallel to the face of the nut and in alinement therewith, and also in cases where the nut is in a pocket or hollow, as for instance, illustrated in the figure of the nuts on the fish plate of the railroad rails shown in Fig. 5. On the side of the wrench I locate a piece F of metal, and secure it suitably to the wrench. Preferably it is secured to the wrench by bolts $F^3$, $F^3$. In cases where the wrench has the curve $E^4$, and the piece F is secured as shown, the piece will have the curved or angulated portion $F^2$. Otherwise this angulated form of the piece F will be omitted. The piece F preferably extends all the way across the part $E^2$ of the wrench and one end of it is against the edge $E^5$ of the part $E^2$. A set screw G is present, and its screw threaded portion $G^3$ is in engagement with a screw threaded hole $F^4$ in the piece F. This set screw has means for rotating it, and for this reason, in the present illustrative instance, I have shown the head in the form of a thumb-piece $G^2$. In using this wrench to unlock the nut and to take the nut off from the bolt, the operator locates the part $E^2$ of the wrench on the nut in the customary manner. He then screws the screw-threaded rod $G^3$ into the recess $B^3$ of the shank $B^2$ of the key B, and continues screwing this rod $G^3$ and draws back the shank $B^2$, and the shank $B^2$ in turn withdraws the key B from the groove $A^2$ of the bolt end or axle. The wrench is now rotated and the nut D thereby unscrewed from said end A.

When the nut is employed with ordinary bolts, the annular flange $D^6$ is dispensed with, because unnecessary. The annular shoulder $D^5$ is advantageous as affording a seat or foundation against which the adjacent edge of the wrench may rest.

In Fig. 5, H indicates a portion of one rail and $H^2$ the adjacent portion of another rail. A fish plate $H^4$ lies against the webs $H^3$ of these rails and the nuts D, and their respective bolts hold the fish plate and the rails firmly and securely together.

In a vehicle, where a wheel at each end of the axle is present, kept in position by a nut, my invention avoids the necessity of making the thread on one axle a left hand thread, and the thread on the other end a right hand thread, the thread of the nuts to correspond.

The modified means for withdrawing the key from the recess of the bolt A consists of a ring X, preferably an elastic one. (See Fig. 7.) The ring is split at one point. Its two portions are drawn apart and the respective ends of the ring are respectively allowed to enter recesses in the shank $B^2$.

In Fig. 8, an elongated bolt $G^3$ extends through the adjacent side of the wrench and engages a screw thread in the recess $B^3$ of the shank $B^2$ aforementioned, the preferred modified form of the wrench in this instance being illustrated in Fig. 8.

In the claims, where the term bolt is employed, it is to be understood as including the screw threaded end of an axle and analogous devices.

What I claim as new, and of my invention and desire to secure by Letters Patent, is:—

1. In a nut locking device, a screw threaded bolt, provided with a groove in its end, and a nut having a central aperture through its closed end, and a key located within the nut, which key is adapted to enter the said groove of the bolt and engage therewith, the key shank in engagement with the wall of the aperture of the nut, and in its end portion provided with a recess interiorly screw threaded, a spring between the key and the adjacent end of the nut, substantially as and for the purposes specified.

2. In a nut locking device, a screw threaded bolt provided with a groove at its end, and a nut having an aperture through its closed end, a key adapted to enter and engage the walls of said groove, and provided with a shank adapted to slide in said nut aperture, yet in engagement with the wall of said aperture, a spiral spring embracing the key shank between the key and the adjacent end of the nut, the key shank having in its free end an interiorly screw threaded recess, substantially as and for the purposes specified.

CLIFFORD C. EARLYWINE.

Attest:
STARBUCK SMITH,
K. SMITH.